US010068085B2

(12) United States Patent
Hartman et al.

(10) Patent No.: US 10,068,085 B2
(45) Date of Patent: Sep. 4, 2018

(54) METHOD AND SYSTEM FOR ALLOWING ANY LANGUAGE TO BE USED AS PASSWORD

(71) Applicant: BlackBerry Limited, Waterloo (CA)

(72) Inventors: Robert Arthur Hartman, Cooper City, FL (US); Rahul Patwa, Sunrise, FL (US); Donald Somerset McCulloch McKenzie, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 143 days.

(21) Appl. No.: 13/918,080

(22) Filed: Jun. 14, 2013

(65) Prior Publication Data

US 2014/0373115 A1 Dec. 18, 2014

(51) Int. Cl.
*G06F 21/30* (2013.01)
*G06F 21/32* (2013.01)
*G06F 21/46* (2013.01)
*G06F 21/31* (2013.01)

(52) U.S. Cl.
CPC .............. *G06F 21/46* (2013.01); *G06F 21/31* (2013.01)

(58) Field of Classification Search
CPC ......... G06F 21/30; G06F 21/46; H04L 63/083
USPC ............... 726/6–8; 380/56; 710/67
See application file for complete search history.

(56) References Cited

U.S. PATENT DOCUMENTS

| | | | |
|---|---|---|---|
| 5,917,484 A | 6/1999 | Mullaney | |
| 6,542,594 B1 * | 4/2003 | LeBoulzec | H04Q 3/62 379/201.03 |
| 6,559,861 B1 | 5/2003 | Kennelly et al. | |
| 6,832,354 B2 * | 12/2004 | Kawano | G06F 3/023 345/168 |
| 7,630,974 B2 | 12/2009 | Remahl et al. | |
| 7,721,222 B1 * | 5/2010 | Shaik | 715/773 |
| 7,841,000 B2 | 11/2010 | Kawano et al. | |
| 8,122,170 B2 * | 2/2012 | Xing et al. | 710/67 |
| 8,132,265 B2 | 3/2012 | Wootton et al. | |
| 8,272,049 B2 * | 9/2012 | Stewart | G06F 21/31 713/183 |
| 8,520,848 B1 * | 8/2013 | Liu | H04L 63/083 380/52 |
| 8,553,860 B1 * | 10/2013 | Bhogal | H04M 3/44 379/93.17 |

(Continued)

OTHER PUBLICATIONS

Anonymous: "12.04—How to Add a Keyboard Layout to the Login Screen?—Ask Ubuntu", Retrieved from the Internet: URL:http://askubuntu.com/questions/171603/how-to-add-a-keyboard-layout-to-the-login-screen; Aug. 4, 2012.

(Continued)

*Primary Examiner* — Morshed Mehedi
*Assistant Examiner* — Viral S Lakhia
(74) *Attorney, Agent, or Firm* — Fish & Richardson P.C.

(57) ABSTRACT

Systems and methods are provided for operating an electronic device, the method comprising storing data related to at least one selected language used during password creation. At password entry prompt, the stored data related to the at least one selected language may be used to select a character mapping based on the stored data related to the at least one selected language, and the character mapping may be applied to the keyboard so that a password may be entered using that character mapping.

18 Claims, 7 Drawing Sheets

(56) References Cited

U.S. PATENT DOCUMENTS

| | | | |
|---|---|---|---|
| 8,752,164 B2* | 6/2014 | Dubovsky | G06F 21/36 380/29 |
| 8,898,064 B1* | 11/2014 | Thomas | G06F 21/00 704/270 |
| 8,997,013 B2* | 3/2015 | Starner et al. | 715/773 |
| 9,552,470 B2* | 1/2017 | Turgeman | G06F 21/32 |
| 9,836,733 B2* | 12/2017 | Course | G06Q 20/206 |
| 9,916,315 B2* | 3/2018 | Kothandam | G06F 17/30106 |
| 2002/0054120 A1* | 5/2002 | Kawano | G06F 3/023 715/773 |
| 2003/0036808 A1* | 2/2003 | Kato | G05B 19/409 700/3 |
| 2004/0225965 A1* | 11/2004 | Garside | G06F 3/04883 715/246 |
| 2007/0089164 A1 | 4/2007 | Gao et al. | |
| 2007/0200827 A1* | 8/2007 | Samal | G06F 3/0236 345/168 |
| 2007/0250920 A1* | 10/2007 | Lindsay | G06F 21/31 726/7 |
| 2008/0172735 A1* | 7/2008 | Gao | G06F 3/04886 726/19 |
| 2008/0177920 A1* | 7/2008 | Dennis | G06F 3/0237 710/200 |
| 2008/0276166 A1* | 11/2008 | Wang-Aryattanwanich et al. | 715/264 |
| 2009/0179781 A1* | 7/2009 | Sakai | G06F 3/0224 341/23 |
| 2009/0190159 A1* | 7/2009 | Toscano | H04N 1/00212 358/1.15 |
| 2010/0070264 A1 | 3/2010 | Lee | |
| 2010/0180338 A1* | 7/2010 | Stewart | G06F 21/31 726/19 |
| 2010/0318695 A1* | 12/2010 | Xing | G06F 3/023 710/67 |
| 2011/0202839 A1 | 8/2011 | AlKazi et al. | |
| 2013/0124187 A1* | 5/2013 | Qin | G06F 3/01 704/8 |
| 2013/0282365 A1* | 10/2013 | Van De Ven | G06F 17/274 704/9 |
| 2013/0342467 A1* | 12/2013 | Cresp et al. | 345/172 |
| 2014/0052725 A1* | 2/2014 | Lee | G06F 17/24 707/736 |
| 2014/0165169 A1* | 6/2014 | Buck | G06F 21/31 726/7 |
| 2015/0106702 A1* | 4/2015 | Scott et al. | 715/265 |

OTHER PUBLICATIONS

Anonymous: "[Bryan] Lunduke.com.>Ubuntu 11.10 Review; I take it back. Unity s cool." Retrieved from the Internet: URL:http://lunduke.com/2011/10/13/ubuntu-1-1-10-review-I-take-it-back-unity-is-cool; Retrieved Aug. 1, 2014.

Anonymous: "IT-Sicherheit: Sicherer Umgang mit Passwortern", May 16, 2011, XP055132787, Retrieved from the Internet: URL:http://www.hungenberg.net/th/de/itsec/passwoerter.html; Retrieved on Aug. 1, 2014.

European Search Report for European Application No. 14172376.7-1870, dated Aug. 11, 2014 (8 pages).

Communication Pursuant to Article 94(3) EPC issued in related European Application No. 14172376.7 dated Mar. 2, 2016.

* cited by examiner

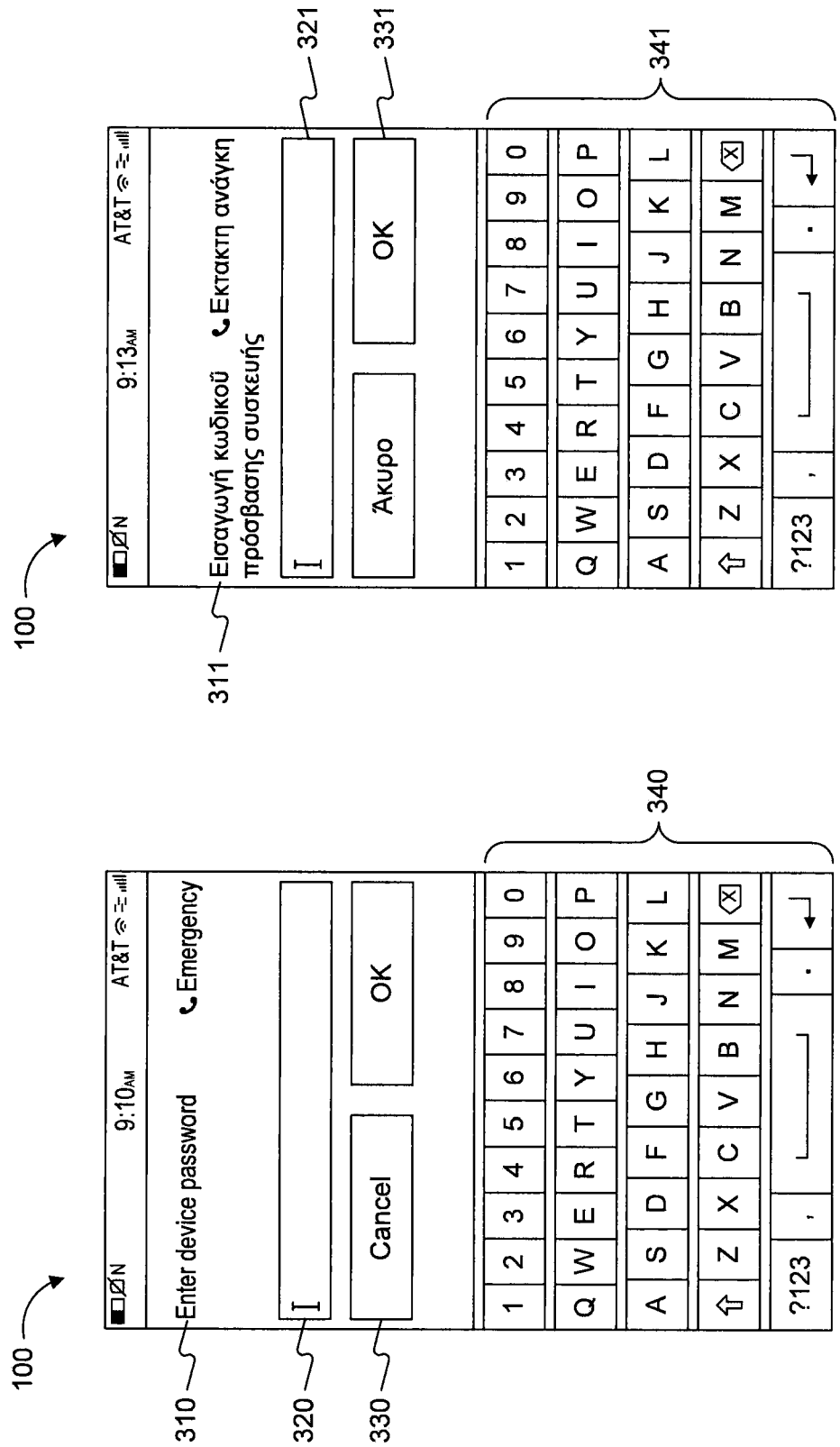

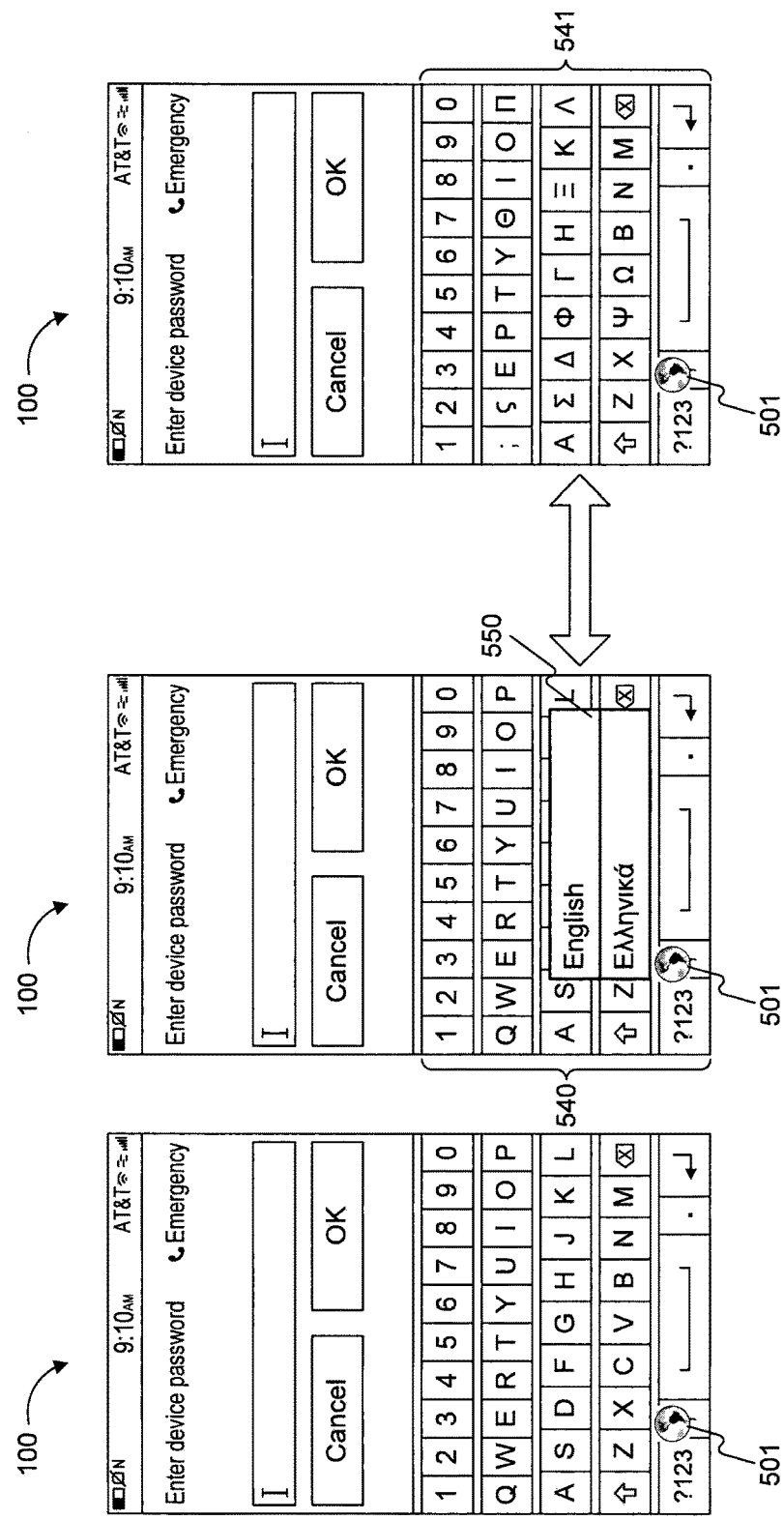

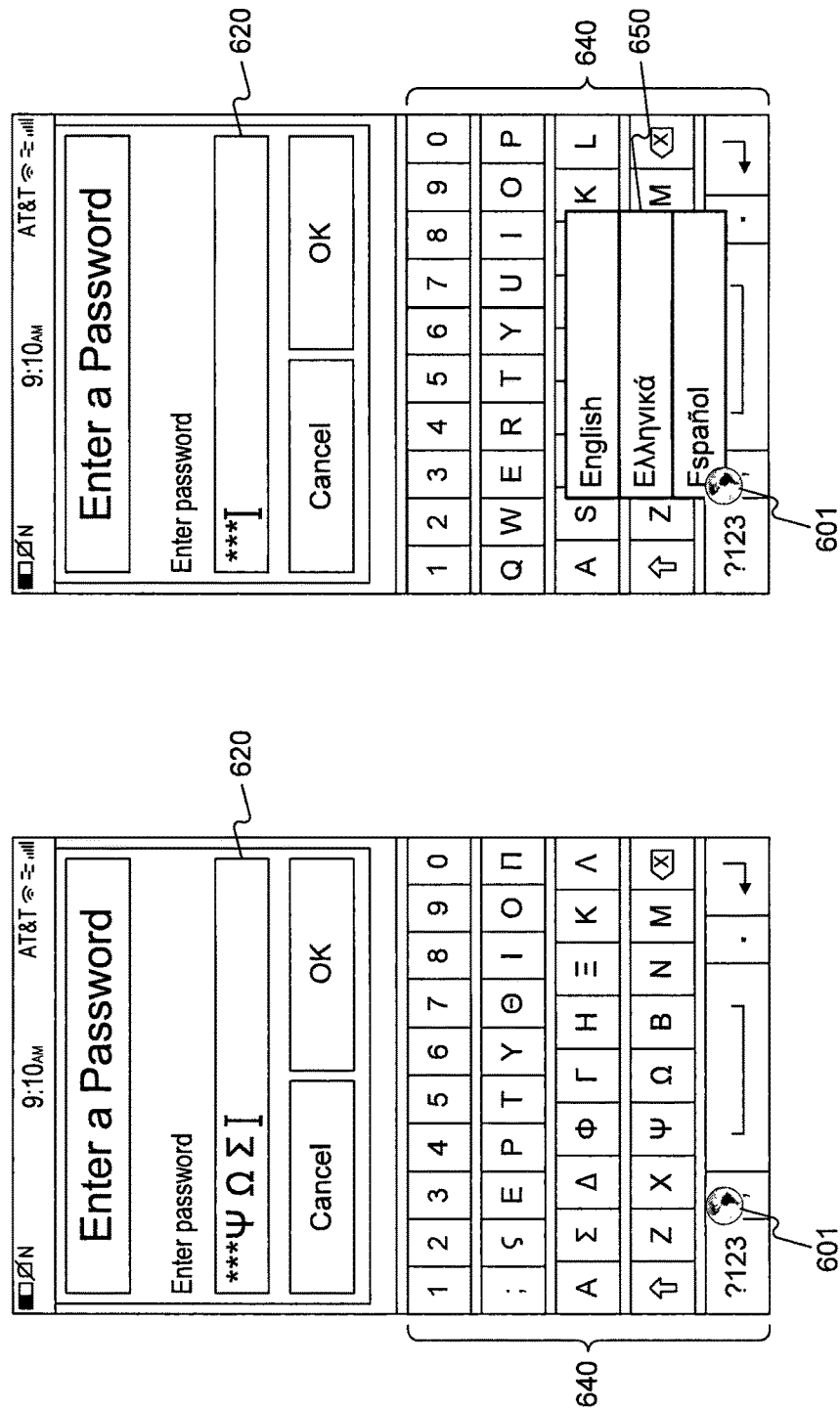

METHOD AND SYSTEM FOR ALLOWING ANY LANGUAGE TO BE USED AS PASSWORD

BACKGROUND

The present disclosure relates to electronic devices, including, but not limited to handheld electronic devices, and their control.

Electronic devices, including portable electronic devices, have gained widespread use and provide many functions requiring the use of passwords. Electronic devices may require passwords for unlocking the electronic device itself. Similarly, passwords may be required by applications or websites accessed using the electronic device. Electronic devices may have a device language, which may be used, for example, for the user interface of the electronic device. Improvements in generating user interfaces for devices utilizing passwords are desirable to accommodate changes in the device language.

BRIEF DESCRIPTION OF THE DRAWINGS

This specification will now describe embodiments of the present disclosure, by way of example only, by referring to the attached figures, described below.

FIGS. 3A and 3B are front views of an example electronic device showing user interfaces having character maps on a keyboard and password entry prompts.

FIGS. 5A-5C are front views of an example electronic device showing a user interface with example language selection prompts.

FIGS. 6A and 6B are front views of an example electronic device showing user interfaces with example language selection prompts, and example password entries.

DETAILED DESCRIPTION

Figure 1:
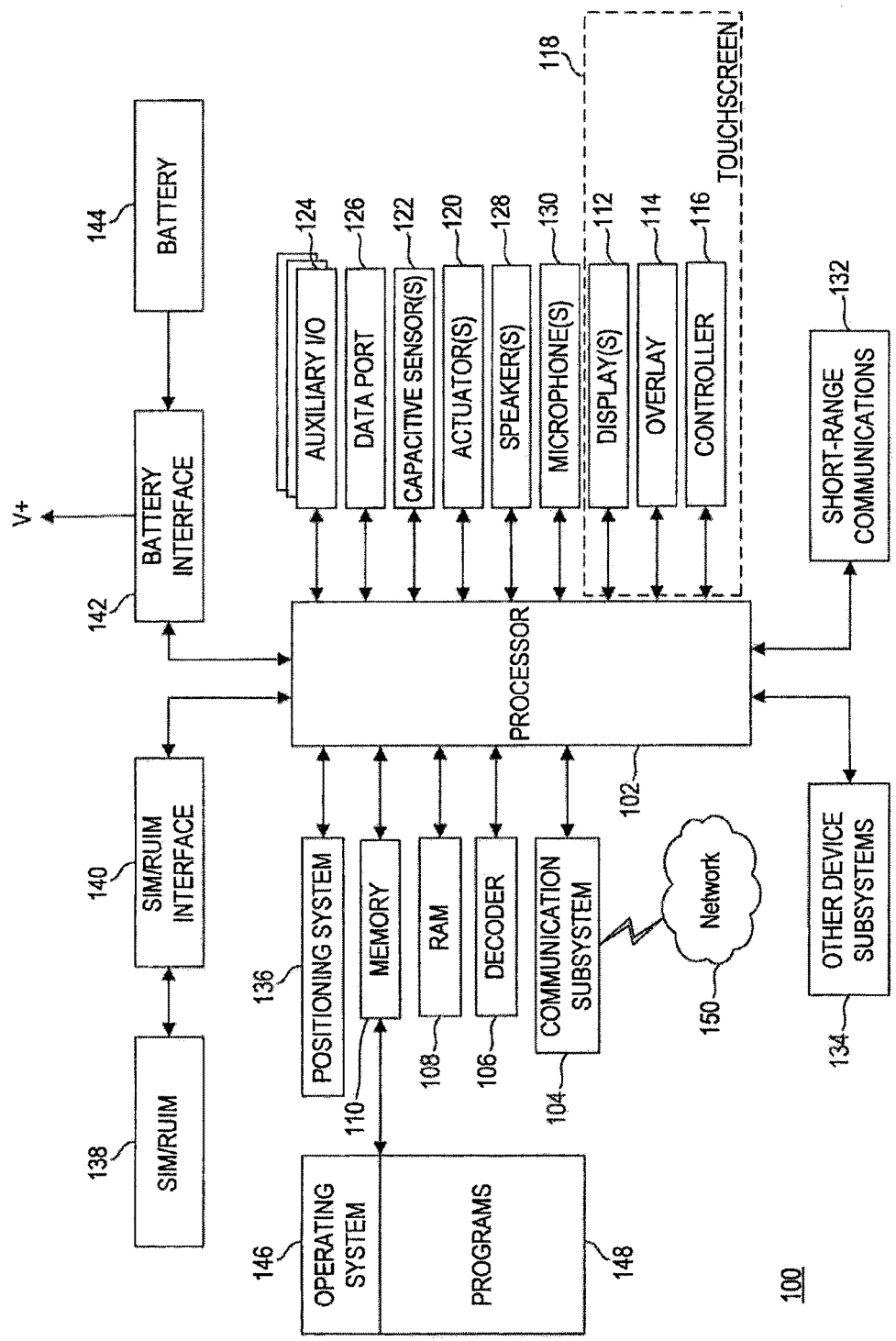
FIG. 1 is a block diagram of an example electronic device.

For simplicity and clarity of illustration, where considered appropriate, this specification repeats reference numerals among the figures to indicate corresponding or analogous elements. In addition, this specification provides numerous details to provide a thorough understanding of the described embodiments. In some instances, well-known methods, procedures, and components have not been described in detail so as not to obscure the described embodiments. Also, the described embodiments do not limit the claims or the scope of the embodiments.

Examples of electronic devices according to this disclosure include personal computers (PCs), laptops, workstations, mobile or handheld wireless communication devices such as pagers, cellular phones, cellular smartphones, wireless organizers, personal digital assistants, wirelessly enabled notebook computers, and the like. Depending on the functionality provided by the electronic device, it might be referred to as a data-messaging device, a tablet, a cellular telephone, a wireless Internet appliance, or a data-communication device (with or without telephony capabilities).

Electronic devices often have a device language, which serves many purposes, and which may be the language that the electronic device would default to when presenting instructions or information on the device's user interface. The device language may, in certain electronic devices, be changed by a user or administrator. In some instances, the device language may be set by the manufacturer to default to a particular language (e.g., English), and the electronic device may include the capability of supporting other languages. The information required to operate an electronic device in one or more languages other than the default language, such as character mappings and dictionaries, may be included in memory on the electronic device. Alternatively, such information may be downloaded or accessed from an external source.

A keyboard may be provided for use as an input mechanism to the electronic device, and may reflect the device language. For example, a virtual keyboard may show a "QWERTY" keyboard (an example of an English character mapping) when the device language is set to English, and a virtual keyboard may show Greek alphabet characters when the device language is set to Greek. Keyboards for use with electronic devices may be traditional physical keyboards, which have keys organized in rows and columns that can be depressed to result in entry of a character. Keyboards may also be touch-sensitive display keyboards or virtual keyboards. The methods and systems disclosed herein are particularly useful in electronic devices that provide virtual keyboards, for which changing the character mapping for the user interface results in the touch-sensitive display showing a new character mapping.

Electronic devices may be configurable to require passwords for unlocking the electronic device itself. Similarly, passwords may be required by applications or web sites being accessed with the electronic device. An electronic device user may create a password in a selected language, and following that creation, the device language may change. When the device language changes, some or all of the user interfaces may have changed to utilize the new device language. For example, the keyboard may have a changed character mapping to accommodate characters associated with the new device language. In some such instances, after a user has created a password in the selected language and the device language subsequently changes, the electronic device may lock itself, for example due to a re-boot or time-out. The user may therefore not be able to enter his password—because the keyboard has now changed to accommodate the new device language, and the user's password may require keys no longer present on the keyboard, or may require keys that are in a different locale on the keyboard. Similar issues are possible with web page or application passwords. Further, in some instances, a character mapping (or language) used during password creation may later be deleted or disabled on the electronic device, and thus the appropriate characters may not be available to the user for re-entering the password at a password entry prompt.

For example, an electronic device user may have created a password in English, and following that creation, the device language may have been changed to Greek. Presenting the Greek keyboard with a password entry prompt when the password is later required, could prevent the user from being able to enter his previously-created English password because he is presented only with the possibility of using Greek letters to enter his English password. FIG. 3B shows a user interface associated with a password protection function on an example electronic device 100, having a virtual keyboard with character mapping 341, in which the device language may have changed to Greek from English. Password entry prompt 311 and confirmation buttons 331 display Greek text ("Άκυρο" and "OK"), but the keyboard displays an English language character mapping 341. Methods and systems to improve the user interface and allow any language to be used for passwords are desirable.

The electronic device itself, a web browser, or application may be configured to encrypt (e.g., with a hash algorithm) and store a password. Using the methods and systems disclosed herein, an electronic device may be configured to remember both a password and the language or character mapping used to create the password. For example, both the password and data related to the language or character mapping used may be encrypted prior to storing, and may be stored in web-browser history (in the case of a web page password) or otherwise stored on the electronic device, and would later be used to present the appropriate character mapping on the user interface for password entry.

The methods and systems disclosed herein thus allow an electronic device user to access the appropriate keys for password entry via the user interface. A user may, using certain disclosed embodiments, use any desired character set when creating a password, resulting in increased security. Such increased security stems both from an increased number of possible passwords, and from the requirement, in some embodiments, that a language is selected for password entry.

According to one disclosed embodiment, a method for operating an electronic device having a keyboard is disclosed. For example, the method may comprise storing data related to at least one selected language used during password creation. The method further comprises presenting, by the electronic device, a password entry prompt on a user interface and selecting a character mapping based on the stored data related to the at least one selected language and applying the character mapping to the keyboard. The process of applying the character mapping to the keyboard may comprise presenting, on the user interface, a virtual keyboard having characters associated with the at least one selected language. Finally, an entered password using the character mapping may be received in response to the password entry prompt. In some embodiments, the method further comprises ensuring that the selected character mapping is accessible by the electronic device during password entry. In additional embodiments, the method further comprises presenting a prompt on the user interface for a choice of languages during password creation.

An administrator may, in some embodiments, preselect a set of languages from which the at least one selected language may be chosen during password creation. In other embodiments, the language choices may be based on device usage history. In some additional embodiments, presenting the password entry prompt on the user interface may comprise the electronic device presenting a prompt for a choice of at least one language for password entry, and updating the character mapping according to the choice so that the appropriate character mapping could be used to enter a previously-created password.

In yet another disclosed embodiment, a communication device includes a display, one or more processors, one or more memories, and instructions to one or more memories. The instructions, when executed by the one or more processors, cause the communication device to perform the steps of: storing data related to at least one selected language used during password creation; presenting, by the electronic device, a password entry prompt; selecting a character mapping based on the stored data related to the at least one selected language; applying the character mapping to the keyboard; and receiving an entered password using the character mapping, in response to the password entry prompt.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Electronic device 100 also includes an operating system 146 and programs 148 that are executed by main processor 102 and are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, an instant message, or a web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. During composition, text characters or other selected input may be displayed in an information entry field on display 112.

For voice communications, the overall operation of electronic device 100 is similar. Speaker 128 outputs audible information converted from electrical signals, and microphone 130 converts audible information into electrical signals for processing.

Main processor 102 is coupled to and can interact with additional subsystems such as a Random Access Memory (RAM) 108; a memory 110, such as a hard drive, CD, DVD, flash memory, or a similar storage device; one or more actuators 120; one or more capacitive sensors 122; an auxiliary input/output (I/O) subsystem 124; a data port 126; a speaker 128; a microphone 130; short-range communications 132; other device subsystems 134; and a touchscreen 118.

Touchscreen 118 includes a display 112 with a touch-active overlay 114 connected to a controller 116. User-interaction with a user interface (UI or GUI), including a virtual keyboard rendered on the display 112 as a user interface for input of characters, or a web-browser, is performed through touch-active overlay 114. Main processor 102 interacts with touch-active overlay 114 via controller 116. Characters, such as text, symbols, images, and other items are displayed on display 112 of touchscreen 118 via main processor 102. A character mapping, stored for example in memory 110, determines which symbols, images, and other items comprise the virtual keyboard rendered on the display 112. Characters are input when, for example, a user touches the touchscreen at a location associated with said character.

Characters are used as a convenient mechanism for users to enter passwords. Passwords may be device passwords, application passwords, web page passwords, or other passwords. A device password is a password used to protect an electronic device, and such a password may be required to operate the electronic device, with the exception, in some cases of a selected few applications. For example, a smartphone device may require a password to use any of the applications installed on the device, but may allow dialing of an emergency number using the telephone application without password entry. An application password is a password that is required to operate one or more applications. A web page password is a password that is used to access a web page or web site.

Passwords may be treated as an array of bytes, and processor 102 may encode a password using any number of standard character encoding, including ISO encodings such as ASCI II and Unicode. For one example, UTF-8 may be used. A UTF-8 encoding schema encodes each character's unicode point to a value between one and four bytes. In the electronic device 100, input may be received from a keyboard, for example from a virtual keyboard rendered on the display 112 as a user interface for input of characters, or from a web-browser performed through touch-active overlay 114. Processor 102 encodes values for each character input, which can then be used by processor 102 to display and store characters.

Figure 2A:
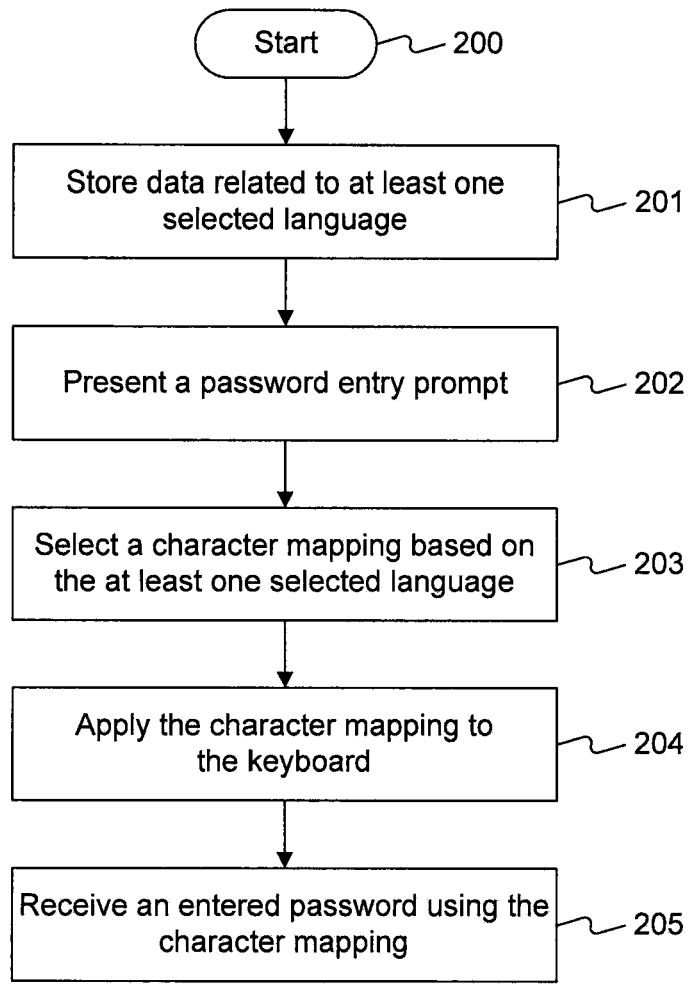
FIGS. 2A-2C are flowcharts of example methods for operating an example electronic device.

FIG. 2A illustrates an example of a method 200 for operating an electronic device having a keyboard 320. Method 200 begins with processor 102 executing instructions to store data related to at least one selected language (step 210). The selected language may be the language used to create a password on electronic device 100. This data may be stored, for example, in memory 110 of device 100 shown in FIG. 1. The instructions may be instructions from a web browser or operating system. In particular, in the case of a web page password, the instructions may be from a web browser. Data related to at least one selected language may be some identifier of the electronic device language at the time of password creation, an identifier of the character mapping in effect on the electronic device keyboard at the time of password creation, or some other data that otherwise identifies the language or character mapping in effect on the electronic device keyboard at the time of password creation. In step 202, processor 102 executes instructions to present a password entry prompt on a user interface. A password entry prompt may be comprised of an information entry field, and optionally, text instructions and confirmation buttons. FIG. 3A shows a user interface having an information entry field 320, text instructions 310 (instructing the user to "Enter device password"), and confirmation buttons 330 (labeled "OK" and "Cancel", in English).

Figure 4:
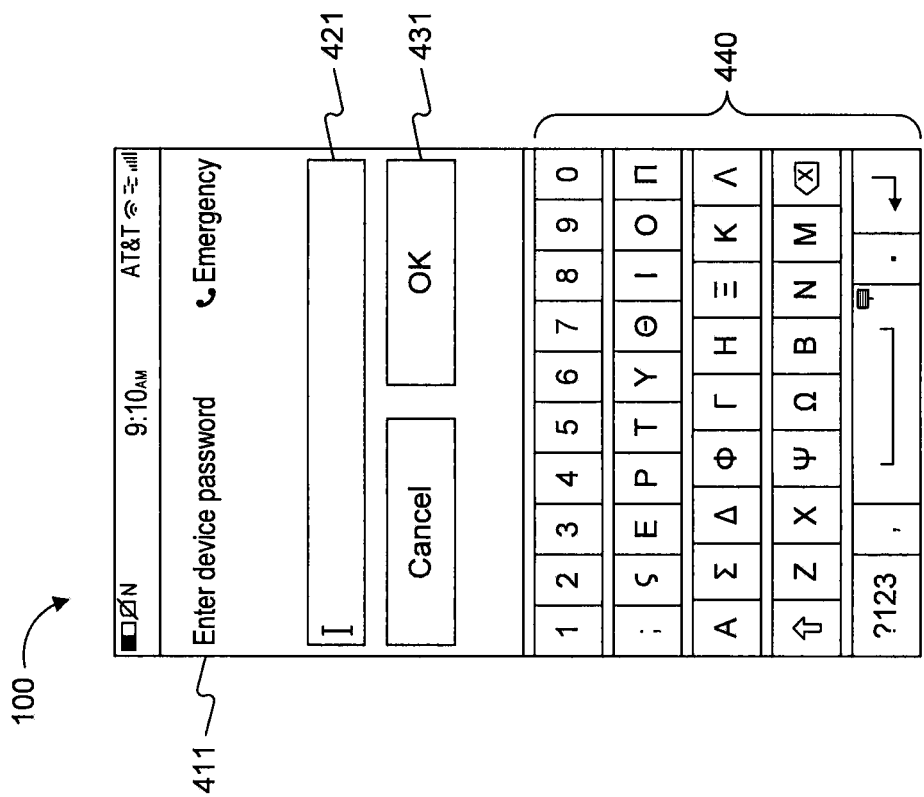
FIG. 4 is also a front view of an example electronic device showing a user interface having a character map on a keyboard and a password entry prompt.

In some embodiments, the processor 102 may use the stored data to present the password entry prompt in the language corresponding to the stored data in step 202. For example, if the stored data indicates that the selected language was Greek, the password entry prompt may be displayed in Greek on the user interface, as depicted on the user interface shown in FIG. 3B at password entry prompt 311. In alternate embodiments, the password device entry prompt may be in the current device language. For example, FIG. 4 shows a user interface having password entry prompt 411 and confirmation buttons 431 (labeled, "OK" and "Cancel") in English.

The stored data related to the at least one selected language is then used in stage 203 to select a character mapping. For example, if the stored data indicates that the selected language was Greek, the character mapping selected may be a character mapping of Greek language characters. In step 204, processor 102 executes instructions to apply the character mapping to the keyboard. For example, in the user interface of FIG. 4, the character mapping 440 contains Greek language characters. In step 205, a password is received using the character mapping. For example, with the user interface of FIG. 4, a password may be entered by a user using the Greek language characters in character mapping 341.

Figure 2B:
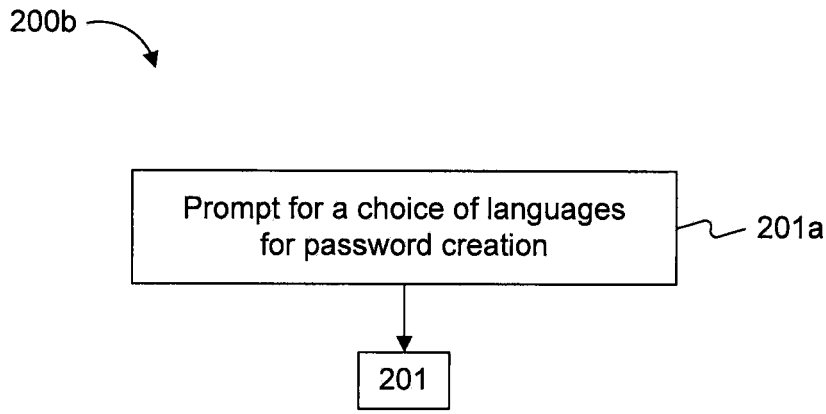

In some embodiments, the electronic device may be configured to allow the user to choose one or more languages for password creation. For example, FIG. 2B shows an alternate method 200b, in which processor 102 executes instructions to cause the electronic device to prompt the user for a choice of languages in step 201a. Such a prompt may be in the form of text, or in the form of an icon. FIG. 5A shows a user interface having an exemplary icon 501 displayed on electronic device 100. The presence of icon 501 may indicate to the electronic device user that they should select a language for password entry. For example, FIG. 5B shows that when the electronic device user selects icon 501, the selections of English and ελληνικά are available in the selections menu 550. The user, for example, may be prompted to choose English or Greek (and in other embodiments, more language options) for password creation. The user may, for example, choose Greek, and then enter a password using a Greek keyboard (a keyboard having the Greek character mapping).

In some embodiments, an administrator may limit the languages that are selectable by the user. For example, an administrator may preselect a set of two or more languages from which a user may select from during password creation. In further embodiments, the languages that are selectable by the user may be based on device usage history. For example, if a user had visited webpages in Greek, or otherwise used applications in the Greek language, Greek may be amongst the languages selectable by the user.

In some embodiments, passwords may be allowed to be entered using more than one character mapping or language. For example, the user may first choose Spanish and enter one or more Spanish characters using the Spanish keyboard, and may then choose Greek and enter one or more characters using the Greek keyboard. Such an embodiment is shown in FIG. 6A, where at information entry field 620, three Spanish characters are displayed (shown masked as *), and three Greek Characters, ψΩΣ. The exemplary password, therefore is a combination of Spanish characters and Greek characters. The device language, in such embodiments may have been set to English, Spanish, Greek, or some other language, and may be subsequently changed to one of any number of languages. A device administrator may also limit the number of languages that can be selected for password creation, in addition, or instead of limiting the actual languages themselves. For example, a limit may be set such that a user can use up to only three character sets for password creation. The methods and systems disclosed herein allow the user to re-enter the mixed-language password via appropriate user interfaces.

In additional embodiments, the data related to the at least one selected language may also be used to ensure that the selected character mapping is accessible by the electronic device during password entry. For example, some electronic devices may allow a user or administrator to delete languages or character mappings from the device. The deleted languages or character mappings would therefore normally not be available for use by the user following their deletion.

When a language or character mapping has been used to create a password on the electronic device, the data related to the at least one selected language used during password creation may be used to prevent the deletion of the associated language or character mapping. For example, if a device or web page password was entered using the Greek keyboard, the Greek character mapping or language may be locked such that it could not be deleted by a user or administrator. For example, a flag might be set during password creation for the Greek character mapping, and when a user or administrator attempts to delete a character mapping, such a flag would be checked and the device would be configured to prevent deletion of a flagged character mapping. In an alternate embodiment, the Greek character mapping or language may be "deleted" but may be made accessible only during password entry. In such an alternate embodiment, the device language may be prevented from being set to Greek, but the Greek character mapping may still be available during password entry.

Figure 2C:
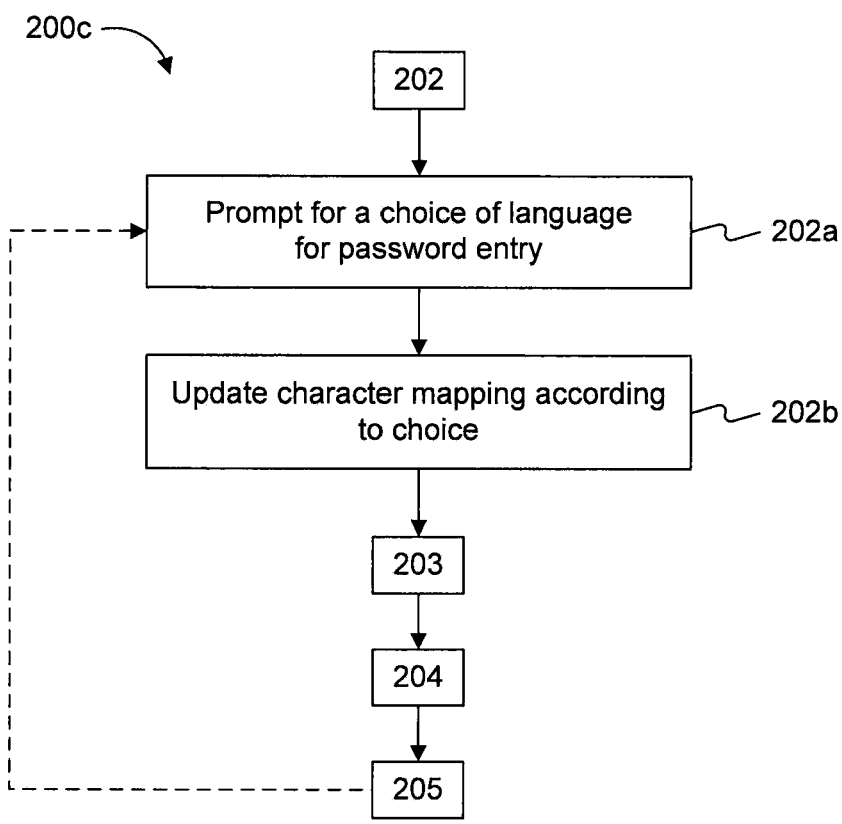

FIG. 2C shows an alternate embodiment, method 200c, in which an electronic device allows the user to choose languages for password entry. In step 202a, processor 102 executes instructions to prompt the user for a choice of languages for password entry. An exemplary prompt is shown in the user interface of FIG. 5B at icon 501, which, when selected, shows selections menu 550. Processor 102 then updates the character mapping according to the choice in step 202b. If a character mapping had already been selected in step 203 and applied in step 204, the character mapping is updated according to the choice in stage 202b. For example, when ελληνικα is selected in FIG. 5B, the character mapping 541 is updated to Greek language characters, as shown in the user interface of FIG. 5C. Characters may then be entered using the character mapping, for example, the Greek character mapping 541, in step 205. In embodiments in which more than one character mapping is necessary to enter the password, method 200c may be repeated. In such an embodiment, such as shown in FIG. 6B, icon 601 may be selected so that the user could change the character mapping to re-enter the mixed-language password that was previously created. First, a user may select Español from the selections menu 650, and enter the three Spanish characters needed. Then, a user may use icon 601 to obtain selections menu 650 again to choose ελληνικα and enter the remaining three Greek characters in information entry field 620.

Embodiments are represented as a software product stored in a machine-readable medium (also referred to as a computer-readable medium, a processor-readable medium, or a computer-usable medium having a computer-readable program code embodied therein). The machine-readable medium is any suitable tangible medium, including a magnetic, optical, or electrical storage medium including a diskette, compact-disk read-only memory (CD-ROM), memory device (volatile or nonvolatile), or similar storage mechanism. The machine-readable medium can contain various sets of instructions, code sequences, configuration information, or other data, which, when executed, cause a processor to perform steps in a method according to an embodiment. Those of ordinary skill in the art will appreciate that other instructions and operations necessary to implement the described embodiments can also be stored on the machine-readable medium. Software running from the machine-readable medium can interface with circuitry to perform the described tasks.

While the embodiments here described are directed to particular implementations of the communication device and the method of controlling the communication device, one should understand that modifications and variations can occur to those skilled in the art. All such modifications and variations are believed to be within the sphere and scope of the present disclosure.

What is claimed is:

1. A method for operating an electronic device having a keyboard, the method comprising:
    presenting, by the electronic device, a prompt for a choice of at least one selected language during password creation;
    receiving a user input selecting the at least one selected language in response to the prompt, wherein the at least one selected language is different from a device language that the electronic device defaults to once the electronic device is unlocked;
    presenting the keyboard with a first character mapping for the at least one selected language;
    receiving a password input for password creation through the keyboard with the first character mapping, wherein the received password input for password creation is inputted in multiple languages;
    storing data related to the at least one selected language used during password creation based on the user input, wherein the data comprises an identifier of the at least one selected language;
    presenting, by the electronic device, the keyboard with a second character mapping for the device language;
    after presenting the keyboard with the second character mapping, presenting, by the electronic device, a prompt for password entry;
    in response to the prompt for the password entry:
        selecting, by the electronic device, the first character mapping based on the identifier stored during password creation; and
        in response to selecting the first character mapping by the electronic device, automatically updating, by the electronic device, the keyboard from the second character mapping for the device language to the first character mapping, wherein the keyboard is updated to the first character mapping while presenting the prompt for password entry; and
    receiving a password input for password entry using the first character mapping, wherein the received password input for password entry is inputted in the multiple languages.

2. The method of claim 1, further comprising:
    ensuring that the selected character mapping is accessible by the electronic device during password entry.

3. The method of claim 1, wherein applying the character mapping comprises:
    presenting, by the electronic device, a virtual keyboard having characters associated with the at least one selected language.

4. The method of claim 1, wherein a device administrator preselects a set of languages, and the at least one selected language is selected from the preselected set of languages during password creation.

5. The method of claim 1, further comprising:
    updating the character mapping according to the choice.

6. The method of claim 1, further comprising:
    presenting, by the electronic device, a language choice, based on device usage history, for the at least one selected language during password creation.

7. An electronic device having a display and a keyboard, comprising:
    a memory containing instructions; and one or more processors configured to execute the instructions to:
present, by the electronic device, a prompt for a choice of at least one selected language during password creation;
receive a user input selecting the at least one selected language in response to the prompt, wherein the at least one selected language is different from a device language that the electronic device defaults to once the electronic device is unlocked;
present the keyboard with a first character mapping for the at least one selected language;
receive a password input for password creation through the keyboard with the first character mapping, wherein the received password input for password creation is inputted in multiple languages;
store data related to the at least one selected language used during password creation based on the user input, wherein the data comprises an identifier of the at least one selected language;
present, by the electronic device, the keyboard with a second character mapping for the device language;
after presenting the keyboard with the second character mapping, present, by the electronic device, a prompt for password entry;
in response to the prompt for the password entry:
select, by the electronic device, the first character mapping based on the identifier stored during password creation; and
in response to selecting the first character mapping by the electronic device, automatically update, by the electronic device, the keyboard from the second character mapping for the device language to the first character mapping, wherein the keyboard is updated to the first character mapping while presenting the prompt for password entry; and
receive a password input for password entry using the first character mapping, wherein the received password input for password entry is inputted in the multiple languages.

8. The method of claim 1, wherein the stored data includes the received password input for password creation.

9. The electronic device of claim 7, wherein the one or more processors are configured to execute the instructions to:
ensure that the selected character mapping is accessible by the electronic device during password entry.

10. The electronic device of claim 7, wherein the one or more processors are configured to execute the instructions to:
allow a device administrator to preselect a set of languages, wherein the at least one selected language is selected from the preselected set of languages during password creation.

11. The electronic device of claim 7, wherein the one or more processors are configured to execute the instructions to:
update the character mapping according to the choice.

12. The electronic device of claim 7, wherein the one or more processors are configured to execute the instructions to:
present a language choice, based on device usage history, for the at least one selected language during password creation.

13. A tangible, non-transitory computer-readable storage medium storing one or more programs, the one or more programs comprising instructions, when executed by a computing device, cause the computing device to:
present, by the computing device, a prompt for a choice of at least one selected language during password creation;
receive a user input selecting the at least one selected language in response to the prompt, wherein the at least one selected language is different from a device language that the electronic device defaults to once the electronic device is unlocked;
present the keyboard with a first character mapping for the at least one selected language;
receive a password input for password creation through the keyboard with the first character mapping, wherein the received password input for password creation is inputted in multiple languages;
store data related to the at least one selected language used during password creation based on the user input, wherein the data comprises an identifier of the at least one selected language;
present, by the electronic device, the keyboard with a second character mapping for the device language;
after presenting the keyboard with the second character mapping, present, by the electronic device, a prompt for password entry;
in response to the prompt for the password entry:
select, by the electronic device, the first character mapping based on the identifier stored during password creation; and
in response to selecting the first character mapping by the electronic device, automatically update, by the electronic device, the keyboard from the second character mapping for the device language to the first character mapping, wherein the keyboard is updated to the first character mapping while presenting the prompt for password entry; and
receive a password input for password entry using the first character mapping, wherein the received password input for password entry is inputted in the multiple languages.

14. The tangible, non-transitory computer readable storage medium of claim 13, wherein the one or more programs cause the computing device to:
ensure that the selected character mapping is accessible by the electronic device during password entry.

15. The tangible, non-transitory computer readable storage medium of claim 13, wherein the one or more programs cause the computing device to:
present a virtual keyboard having characters associated with the at least one selected language.

16. The tangible, non-transitory computer readable storage medium of claim 13, wherein the one or more programs cause the computing device to:
allow a device administrator to preselect a set of languages, wherein the at least one selected language is selected from the preselected set of languages during password creation.

17. The tangible, non-transitory computer readable storage medium of claim 13, wherein the one or more programs cause the computing device to:
update the character mapping according to the choice.

18. The tangible, non-transitory computer readable storage medium of claim 13, wherein the one or more programs cause the computing device to:

present a language choice, based on device usage history, for the at least one selected language during password creation.

* * * * *